May 14, 1935.  A. M. L. LEVOYER  2,001,619
MOTOR CAR WITH TRAILER FOR CAMPING
Filed April 1, 1932   3 Sheets-Sheet 1
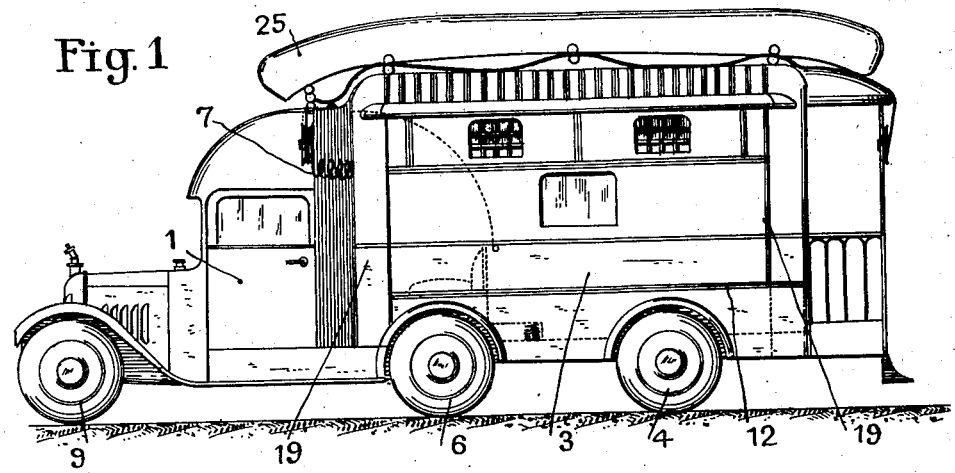
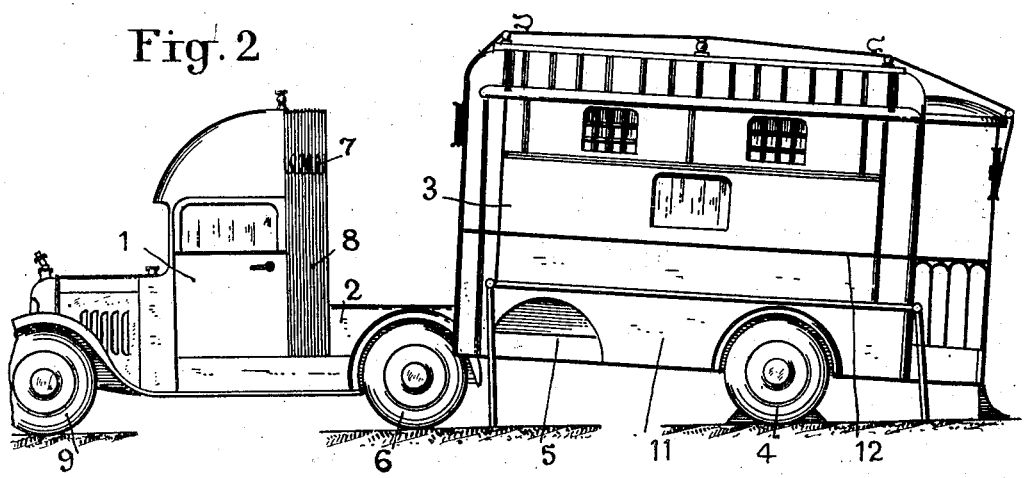
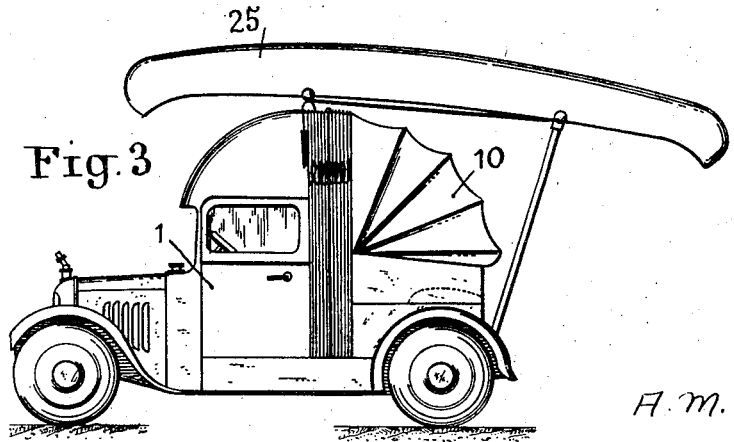
A. M. L. Levoyer
INVENTOR
By: Glascock Downing & Seebold
Attys.

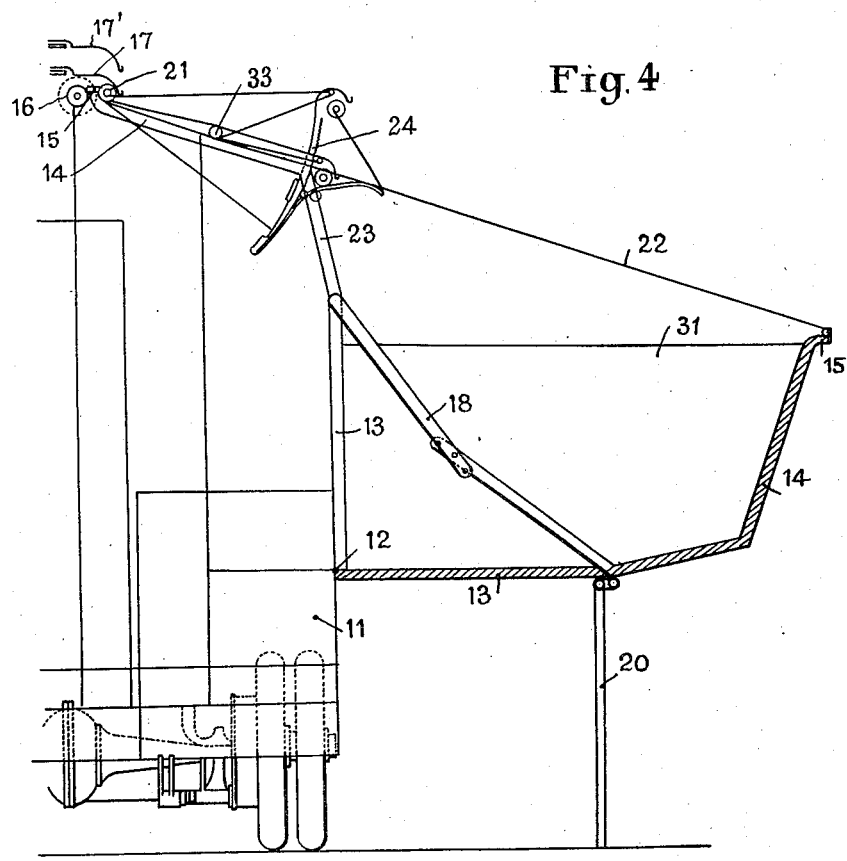
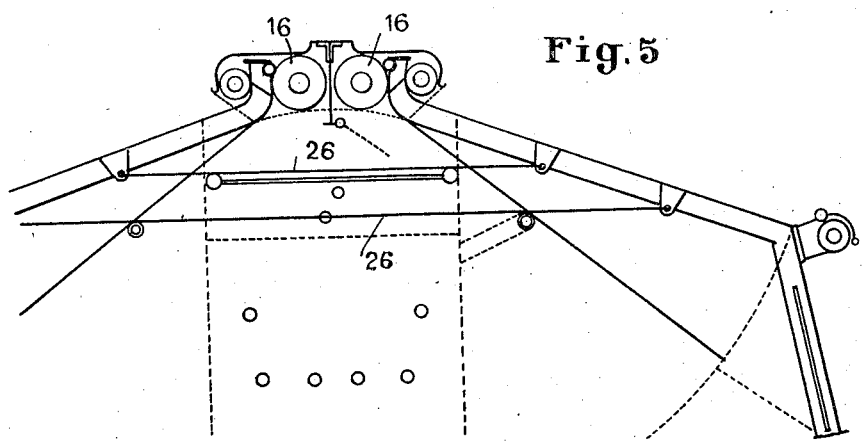

May 14, 1935.　　　A. M. L. LEVOYER　　　2,001,619
MOTOR CAR WITH TRAILER FOR CAMPING
Filed April 1, 1932　　3 Sheets-Sheet 3

A. M. L. Levoyer
INVENTOR

By: Marks & Clerk
ATTYS.

Patented May 14, 1935

2,001,619

UNITED STATES PATENT OFFICE 2,001,619

MOTOR CAR WITH TRAILER FOR CAMPING

Antoine Marie Louis Levoyer, Paris, France

Application April 1, 1932, Serial No. 602,578
In France, April 3, 1931

1 Claim. (Cl. 296—23)

My invention has for its object a unit constituted by a motor-car and a trailer for camping, the trailer being arranged so as to be connected with said motor-car for traveling or to be transformed into a camping bungalow at halting places.

It has already been proposed to use trailing cars which are to be drawn by motor-cars and transformable into camping bungalows, but the devices proposed to such effect are connected with the drawback of allowing only a very small number of travellers to be lodged in said bungalow as well during traveling as at halting places, whilst on another hand, the unit has a relatively small resistance and the comfort of same is not always sufficient.

The unit motor-car trailer according to my invention which remedies the above mentioned deficiencies, comprises a motor-car of a reduced length which may constitute a drawing-car and can be individually used. Said car is provided at its rear end with a support and drawing member for the front end of the trailer which may have two or a greater number of wheels, said trailer having the appearance of a closed building, the lateral and upper walls of which are hinged on convenient horizontal axes whilst their top edge receives a rolled up fabric or cloth carried by a convenient rolling drum with a view of allowing by the simple lowering on each face of the trailer of the unit constituted by the external corresponding wall, the transformation of said trailer into a bungalow having a large area covered by the unrolled fabric or cloth constituting a tent, the unit thus obtained being eventually re-inforced by means of additional removable supports.

In the accompanying drawings which show by way of example constructional forms of the unit motor-car trailer according to my invention:—

Fig. 1 is a side view of the motor-car and trailer in their position of traveling.

Fig. 2 is a similar view showing the parts when the trailer is being separated from its trailing-car.

Fig. 3 shows the motor-car alone transformed into a pleasure car and carrying for instance a boat.

Fig. 4 is a half cross-section of the car, on a larger scale, showing the arrangement of the movable walls together with their operating members.

Fig. 5 shows a modification of Fig. 4.

Figure 6:
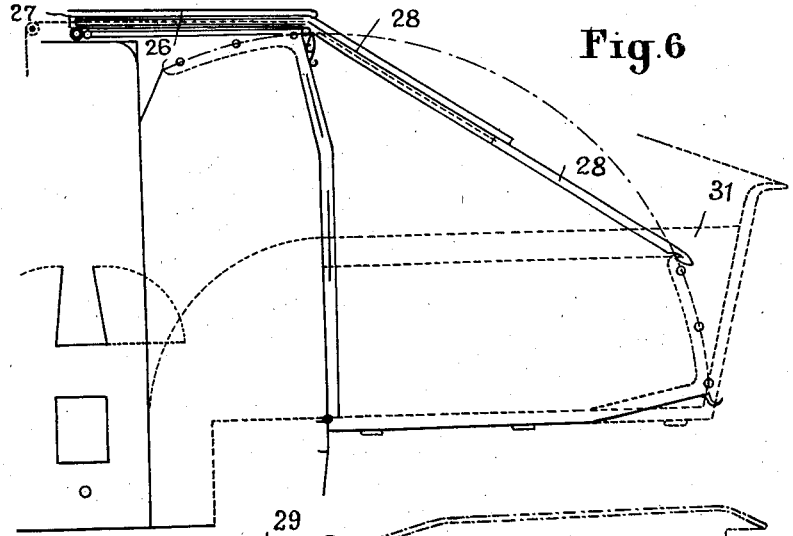
Figs. 6 and 7 are other modifications of Fig. 4.

The unit comprises a motor-car 1 of any desired power which may be of any convenient shape and arrangement. Said car receives on the rear end of its frame 2 the front end of a trailer 3. Said trailer which is provided with both carrying and directing wheels 4 arranged in the vicinity of its rear end, is thus carried through its front end upon frame 2 thus constituting a unit with the frame of motor-car 1. Recesses 5 are provided for accommodating wheels 6 of said car 1. A locking device is provided and constitutes for instance a group of coupling devices 7 (Figs. 1 and 2) securing the car with the trailer, a connection which may be completed by means of a convenient bellows like construction 8 of any convenient substance, such as for instance fabric, india-rubber, leather or the like, securing the car 1 to trailer 3.

The trailer 3 may be rigidly connected with the motor-car 1 whilst wheels 4 which may be conveniently connected with the front wheels 9 of the motor-car 1, allows the motor-car trailer to travel along any roads even with very short turnings thus allowing people occupying said unit to attain any desired camping place.

As seen in Fig. 3, the car 1 carries a sort of removable hood 10 which may cover the rear end of said motor-car and transform the latter into a perfectly comfortable motor-car.

The trailer 3 which may have any convenient internal arrangement and any desired dimensions convenient with the width of roads, is provided with a lower part 11 rigidly connected with the frame of said trailer. Said lower part 11 which constitutes what may be termed the body of the trailer, receives the lower end of a movable wall 13 which is solid with an inclined part 14 connected with said wall 13 at a convenient angle.

The part 14, which for the traveling position constitutes a fastening device for the roof of the trailer, receives on its extreme lower edge 15 the extreme edge of a piece of canvas or fabric of convenient dimensions which may be rolled up upon a roller 16 which may rotate in convenient bearings not shown in the drawings.

Rollers 16 are protected by a movable cap 17 which may be brought either in the closing position 17 (Fig. 4) or into the opening position 17'.

A convenient operating device is provided on the axis of the rollers 16 for causing the same to rotate round its longitudinal axis.

Stiffening bars 18 are swiveled on the end posts of the trailer provided for instance at 19 (Fig. 1) for allowing the parts 13, 14, to be kept in their position of camping as shown in Fig. 4.

Posts 20 in appropriate number may be arranged under the parts 13, 14, when the same are lowered into their position for camping.

In its stationary position, the inclined part 14 which constitutes a fastening device for the roof and which receives a roller 21 with the fabric constituting the surface of the roof, is engaged through its internal edge 15 against the roller 16, same being covered by the movable cap 17.

When the trailer 3 is used as a camping bungalow, the movable walls 13, 14, are turned round their hinges 12 from vertical position shown in full lines in Figs. 1, 2 and 4, into the position shown in Fig. 4, may support in each of the two longitudinal halves of the trailer 3 a very wide mattress.

During said lowering, the longitudinal internal edge 15 of the roof 14 carries with it a canvas fabric from the roller 16 and brings the same into the position shown at 22 (Fig. 4) thus constituting a roof for the corresponding extended beds.

Said beds may thus be carried only by the upper edge of the lower part 11 carrying the hinges 12 of the body 11 on either side of the trailer thus leaving the centre part of said trailer completely free.

In order to allow the trailer to be conveniently ventilated as well during the day time as during the night, the portion 14 may carry a roller 33 with straps (Fig. 4) the operation of which conveniently combined with the operation of the roller 21 to allow the top to be uncovered. Several sections of said roof may be provided with a raising device by hinging each section and by means of a member such as a toothed segment 24 which may receive any convenient operating means. Said sections of the roof may then be raised by turning them around rollers 21 thus constituting a wide ventilating opening.

For the position of traveling shown in Fig. 1, the trailer 3 has its front end carried by the rear part of the motor-car 1, and is locked to the said car, by the housing at the rear part of said car in front part of the trailer, and also, by means of the connecting members shown at 7 and which may be resilient. The bellows portions 8 are provided for additionally securing the connection and allowing the room of the trailer 3 to be in communication with the seat of the driver of the car. The unit may carry upon its roof any desired additional load, such for instance as a boat 25 as shown in Fig. 1, said boat resting for instance upon the rollers provided on the cap 17 and one of which is movable for locking.

The rear wheels 4 may swivel in the same direction and extent as the front wheels 9 of the motor-car 1. The unit thus constituted is easy to be handled and may travel on any road or way, which allows people occupying the car and trailer, to freely choose their halting places, either along a road or in any other desired place.

Should it be desired to separate the trailer from its motor-car for allowing the latter to be used as a pleasure car the connecting devices 7 are first disconnected, then the trailer is moved into the position indicated in Fig. 2 for disengaging it from the motor-car 1. The latter is taken away, the trailer being afterwards brought into a convenient horizontal position.

The motor-car 1 may then be completed by its removable hood 10 (Fig. 1) which gives it the appearance of a road vehicle, said car 1 being thus in a position to be used for runs, etc.; the boat 25 may then also be carried by the motor-car 1 as shown in Fig. 3.

Fig. 5 shows diagrammatically on a larger scale a slight modification of the arrangement shown in Fig. 4, comprising transverse fastening devices 26 which are conveniently removable, said parts functioning to secure the rigidity of the roof during the travel.

For allowing a convenient ventilation of the trailer when transformed into a camping bungalow, the vertical walls 13 having been brought into the hatched position shown in Fig. 4, the longitudinal axis of rollers 16 may be rendered movable thus ventilating the trailer through its roof.

According to the modification of Fig. 6, under a fixed roof 26 are arranged slides or cases 27 receiving telescopic panels 28 which, when traveling, may be brought inside said cases 27 either by means of withdrawing parts such as springs or the like, or by means of tractive cables controlled by means of a convenient handle and which at the time of transformation for camping may be brought to occupy the position shown in full lines in Fig. 6 for constituting a shelter for the rest rooms thus formed.

Figure 7:
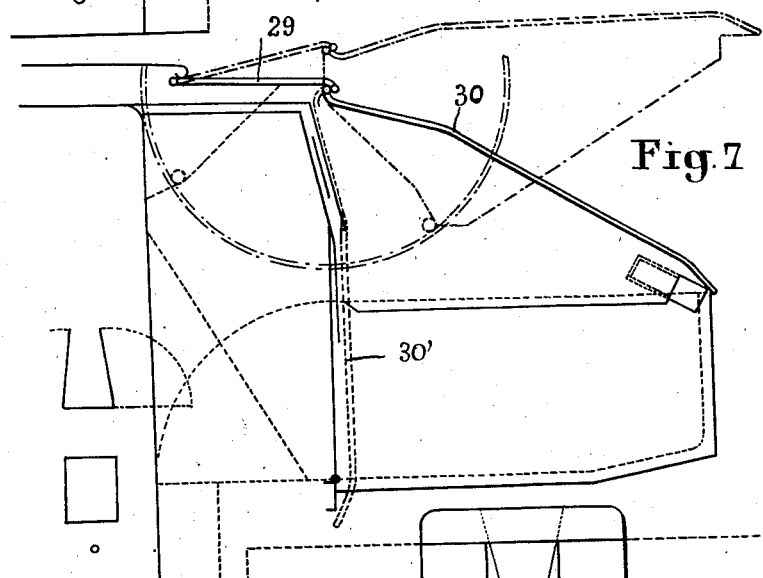

In the modification of Fig. 7, the lateral part 29 of the roof is movable for occupying the position shown in dot-and-dash lines, and said part may receive on its external edge one or several panels 30 which may be hinged at the end of the lateral part of roof 29 and may be provided with the folding posts or the like. Every panel 30 may occupy either the position shown in full lines for camping during the night, or the position shown in dot-and-dash lines for camping during the day time, thus protecting occupying people against the sun whilst securing the ventilation.

During traveling, panels 30 are brought into the position 30' against the corresponding wall of the closed trailer.

Figure 8:
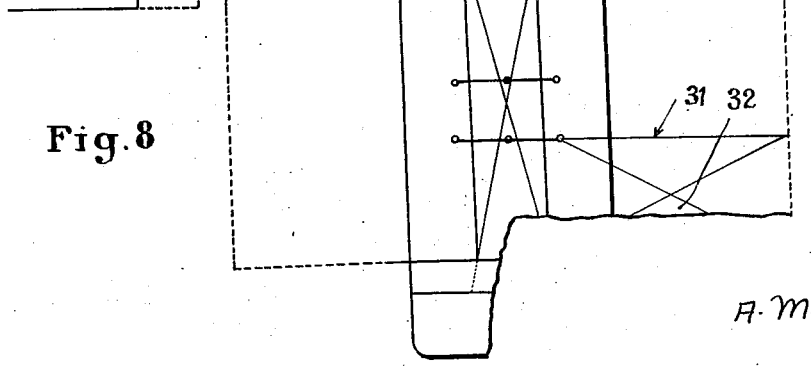
Fig. 8 shows on a reduced scale a diagrammatic plan view of the device extended.

In the several forms of construction, re-inforcing devices such as 13, 14, (Fig. 5) may be provided with one or several walls 31 (Fig. 8), either rigid or foldable which, in the position of camping, as shown in Fig. 8, could determine the formation of independent compartments or rooms 32.

By conveniently arranging said removable walls 31, it is possible to divide the camping bungalow into a number of independent rooms thus increasing the comfort of the unit. In the several forms of construction, the operations of unfolding and folding of the camping bungalow may be effected either automatically by means of release springs or by means of operating members such as winches or the like, the stays being if necessary substituted for stretching members or combined with the same.

The invention may be used as a traveling house transformable into a camping bungalow, traveling store, a single motor-car such as 1, being in a position to draw or haul several trailers such as 3, the connection of which may be obtained in any convenient manner during traveling.

What I claim is:—

A trailer having a lower portion, a cap and vertical sides and a solid roof, the side and half the solid roof being hinged to said lower portion to move as a unit, a roller near the middle of the top of the trailer beneath said cap and a canvas fabric carried by the roller and normally rolled up thereon but adapted to be unrolled from said roller and attached to the outer edge of the turned down side of the roof portion, when the side is turned to horizontal position said cap being movable to allow ventilation to said trailer.

ANTOINE MARIE LOUIS LEVOYER.